United States Patent
Fert et al.

(10) Patent No.: US 12,305,522 B2
(45) Date of Patent: May 20, 2025

(54) TURBOMACHINE LUBRICATION SYSTEM COMPRISING A BYPASS FOR PREFERENTIALLY SUPPLYING LUBRICANT TO A LOW-SPEED REDUCTION GEAR

(71) Applicant: SAFRAN AIRCRAFT ENGINES, Paris (FR)

(72) Inventors: Jérémy Edmond Fert, Moissy-Cramayel (FR); Jacques Auriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/249,148

(22) PCT Filed: Oct. 12, 2021

(86) PCT No.: PCT/FR2021/051768
§ 371 (c)(1),
(2) Date: Apr. 14, 2023

(87) PCT Pub. No.: WO2022/079382
PCT Pub. Date: Apr. 21, 2022

(65) Prior Publication Data
US 2023/0407764 A1 Dec. 21, 2023

(30) Foreign Application Priority Data
Oct. 15, 2020 (FR) ........................................ 2010565

(51) Int. Cl.
*F01D 25/20* (2006.01)
*F01M 1/16* (2006.01)

(52) U.S. Cl.
CPC ............... *F01D 25/20* (2013.01); *F01M 1/16* (2013.01); *F05D 2220/323* (2013.01); *F05D 2260/40* (2013.01); *F05D 2260/98* (2013.01)

(58) Field of Classification Search
CPC ...... F01M 1/16; F01D 25/20; F05D 2220/323
(Continued)

(56) References Cited

U.S. PATENT DOCUMENTS 4,170,873 A * 10/1979 Milo ...................... F01D 25/20
60/39.08
5,121,599 A * 6/1992 Snyder .................... F16N 39/06
60/39.08

(Continued)

FOREIGN PATENT DOCUMENTS

| EP | 0500487 A1 | 8/1992 |
|---|---|---|
| EP | 2630340 A2 | 8/2013 |
| EP | 2855885 A1 | 4/2015 |

OTHER PUBLICATIONS

International Search Report for issued in Application No. PCT/FR2021/051768 dated Feb. 18, 2022.
(Continued)

*Primary Examiner* — Henry Y Liu
*Assistant Examiner* — Mark K Buse
(74) *Attorney, Agent, or Firm* — McDonald Hopkins LLC

(57) ABSTRACT

A lubrication system for a turbomachine which includes a reduction gear. The lubrication system includes a main branch and a bypass branch which is arranged in parallel with the main branch. The main branch includes a heat exchanger. The bypass branch includes a hydraulic resistance that is lower than the hydraulic resistance of the main branch. The reduction gear is located downstream of the main branch and the bypass branch. The lubrication system includes at least one bypass device that is configured to
(Continued)

supply the bypass branch with lubricant when a pressure value of the lubricant is below a threshold value.

16 Claims, 10 Drawing Sheets

(58) Field of Classification Search
USPC .......................................................... 184/6.11
See application file for complete search history.

(56) References Cited

U.S. PATENT DOCUMENTS

| | | | |
|---|---|---|---|
| 7,640,723 B2* | 1/2010 | Alexander | F02C 7/06 |
| | | | 60/39.08 |
| 2009/0235630 A1* | 9/2009 | Norris | F01D 25/20 |
| | | | 60/39.08 |
| 2010/0212281 A1* | 8/2010 | Sheridan | F01D 25/20 |
| | | | 184/26 |
| 2015/0167555 A1* | 6/2015 | Mottet | F01D 25/18 |
| | | | 60/39.08 |

OTHER PUBLICATIONS

Written Opinion for PCT/FR2021/051768 dated Feb. 18, 2022.
Search Report issued in French Patent Application No. 2010565 dated Jun. 10, 2021.

* cited by examiner

TURBOMACHINE LUBRICATION SYSTEM COMPRISING A BYPASS FOR PREFERENTIALLY SUPPLYING LUBRICANT TO A LOW-SPEED REDUCTION GEAR

This is the National Stage of PCT international application PCT/FR2021/051768, filed on Oct. 12, 2021 entitled "TURBOMACHINE LUBRICATION SYSTEM, COMPRISING A BYPASS FOR PREFERENTIALLY SUPPLYING LUBRICANT TO A LOW-SPEED REDUCTION GEAR", which claims the priority of French Patent Application No. 2010565 filed Oct. 15, 2020, both of which are incorporated herein by reference in their entireties.

TECHNICAL FIELD

The invention relates to the general technical field of aircraft turbomachines such as turbojet engines and turboprop engines. More precisely, the invention belongs to the technical field of lubrication systems for turbomachines.

PRIOR ART

Some turbomachines include a reduction gear for driving a fan of the turbomachine. This reduction gear is for example an epicyclic reduction gear. It is in particular mechanically connected to a shaft of the low-pressure spool, which comprises a low-pressure compressor and a low-pressure turbine of the turbomachine.

These turbomachines comprise a lubrication system that includes heat exchangers for cooling the lubricant, bearing lubrication chambers of the turbomachine, and a lubrication chamber of the reduction gear.

Lubricant supplies the lubrication chamber of the reduction gear both to cool the reduction gear and to lubricate the teeth of the reduction gear. When the reduction gear of the turbomachine is operating at low speed, the pressure and the flow rate of the lubricant in the lubrication system may be caused to be very low. The reduction gear may be insufficiently supplied with lubricant, which is liable to damage it.

DESCRIPTION OF THE INVENTION

The invention aims to at least partially solve the problems encountered in the solutions of the prior art.

In this regard, the object of the invention is a lubrication system for a turbomachine that includes a reduction gear for driving a module of the turbomachine.

According to the invention, the lubrication system comprises a main branch and a bypass branch that is arranged in parallel with the main branch. The main branch comprises a heat exchanger. The bypass branch comprises a hydraulic resistance that is less than the hydraulic resistance of the main branch. The reduction gear is located downstream of the main branch and of the bypass branch.

The lubrication system comprises at least one bypass device that is configured to supply the bypass branch with lubricant when a pressure value of the lubricant is below a threshold value.

By means of the lubrication system according to the invention, the reduction gear is supplied with lubricant in a privileged manner, by means of the bypass branch, with respect to the rest of the turbomachine when the flow rate of lubricant and the pressure of the lubricant are too low to supply the whole of the turbomachine with lubricant.

The reduction gear is for example supplied with lubricant by the bypass branch when the turbomachine is operating at low speed. It is in particular supplied with lubricant by the main branch when the flow rate and the pressure of the lubricant are sufficient for supplying the whole of the turbomachine, for example when the turbomachine is operating at a high speed.

The lubricant is typically oil.

The invention may optionally include one or more of the following features combined with each other or not.

According to one design particularity, the bypass device is configured to supply the main branch with lubricant when the pressure value of the lubricant is strictly greater than the threshold value.

Preferably, the bypass device is mechanically and/or hydraulically controlled by pressure of the lubricant.

According to one design particularity, the bypass device comprises a lubricant inlet, a first lubricant outlet that is fluidically connected to the bypass branch, a second lubricant outlet that is fluidically connected to the main branch, an obturator configured to at least partially close off the first outlet and/or the second outlet, and a means for elastically acting on the obturator that is configured to elastically act on the obturator so that it closes off the second outlet.

Preferably, the obturator is configured to allow lubricant to circulate towards the first outlet when a lubricant pressure is below the threshold value.

According to one design particularity, the bypass device comprises a first bypass valve and/or a second bypass valve.

Preferably, the obturator of the first bypass valve comprises a slide. Preferably, the obturator of the second bypass valve comprises a slide.

Preferably, the first bypass valve is bistable. Preferably, the first bypass valve comprises a first stable open position wherein the first bypass valve supplies the bypass branch with lubricant and a second stable open position wherein the first bypass valve supplies the main branch with lubricant.

Preferably, the second bypass valve is bistable. Preferably, the second bypass valve comprises a first stable open position wherein the second bypass valve supplies the bypass branch with lubricant and a second stable open position wherein the second bypass valve is configured to supply the main branch with lubricant.

According to one design particularity, the bypass device comprises a first bypass valve and a second bypass valve that is fluidically connected in series to the first bypass valve so that the first bypass valve and the second bypass valve supply the bypass branch with lubricant when the pressure value of the lubricant is below the threshold value. The first bypass valve is configured to fluidically supply the main branch directly when the pressure value of the lubricant is strictly greater than the threshold value.

According to one design particularity, the first bypass valve comprises a lubricant inlet, a first lubricant outlet, a second lubricant outlet that is fluidically connected to the main branch upstream of the heat exchanger, an obturator configured to close off the first outlet or the second outlet, and a means for elastically acting on the obturator that is configured to elastically act on the obturator so that it closes off the second outlet. The obturator of the first bypass valve is configured to allow lubricant to circulate towards the first outlet when a lubricant pressure is below the pressure threshold value.

The second bypass valve comprises a lubricant inlet, a first lubricant outlet that is fluidically connected to the bypass branch, a second lubricant outlet that is fluidically connected to the main branch upstream of the heat exchanger, an obturator configured to close off the first outlet or the second outlet, and a means for elastically acting on the obturator that is configured to elastically act on the obturator so that it closes off the second outlet. The obturator of the second bypass valve is configured to allow lubricant to circulate towards the first outlet when a lubricant pressure is below the pressure threshold value.

The first outlet of the first bypass valve is in particular fluidically connected to the lubricant inlet of the second bypass valve.

According to one design particularity, the lubrication system comprises a non-return device that is configured to limit/prevent the circulation of lubricant from the reduction gear to the main branch.

Preferably, the non-return device comprises a non-return valve.

According to one design particularity, the lubrication system comprises an obturator-position monitoring device that is configured to monitor the position of the obturator of the bypass device.

Preferably, the monitoring device is configured to determine a lubricant pressure in the main branch, for example by means of a first pressure sensor, and to determine a lubricant pressure in the bypass branch, for example by means of a second pressure sensor. The monitoring device can monitor the position of the obturator of at least one bypass valve by comparing the lubricant pressure value in the main branch and the lubricant pressure value in the bypass branch.

According to one design particularity, the main branch comprises the heat exchanger, a filter, a reservoir, a pump and/or a valve.

Preferably, the main branch comprises a lubricant distributor.

According to one design particularity, the main branch and/or the bypass branch are configured to supply lubricant to an accessory drive box for a turbomachine that includes a fuel pump, a lubricant pump, an electrical generator and/or a starter for starting the turbomachine.

Preferably, the starter comprises a gear train.

The invention also relates to a turbomachine comprising a reduction gear, a module and a lubrication system as defined above. The turbomachine module comprises a fan and/or a propeller, a compressor and a turbine. The reduction gear is configured to be driven by the turbine.

Preferably, the turbine is a low-pressure turbine of the turbomachine. The turbomachine is preferably a turbojet engine. The turbomachine is in particular an aircraft turbomachine.

BRIEF DESCRIPTION OF THE DRAWINGS

The present invention will be best understood from the reading of the description of example embodiments, given purely by way of indication and in no way limitatively, referring to the accompanying drawings, on which.

DETAILED DESCRIPTION OF PARTICULAR EMBODIMENTS

Identical, similar or equivalent parts of the various figures bear the same numerical references so as to facilitate passing from one figure to the other.

Figure 1:
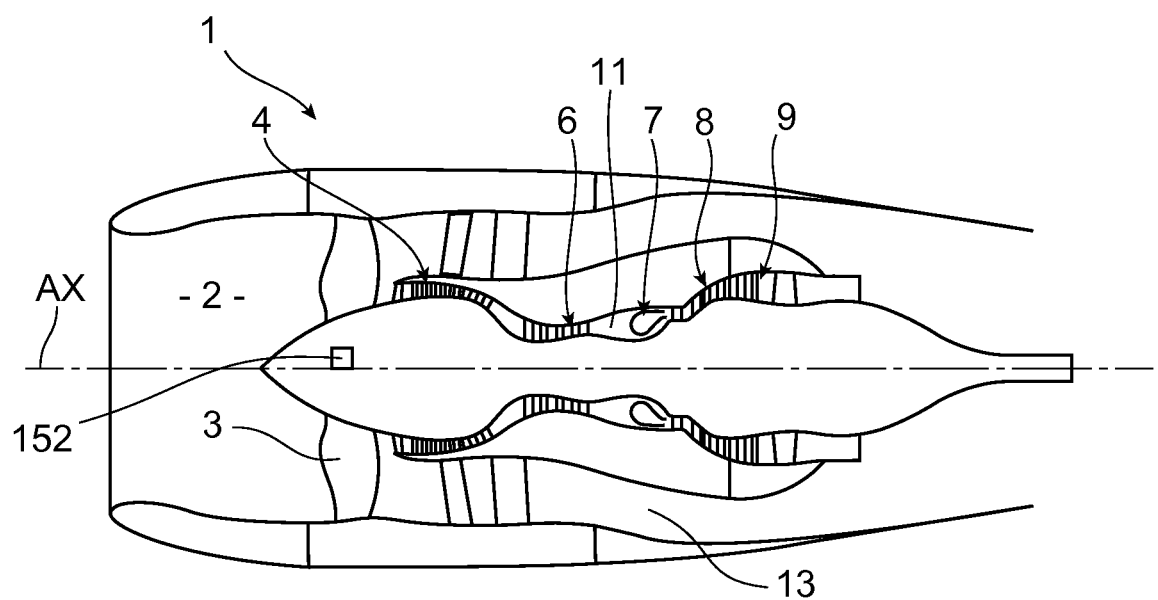
FIG. 1 shows a turbomachine comprising a lubrication system according to a first embodiment of the invention.

FIG. 1 shows a bypass twin-spool turbomachine 1. The turbomachine 1 is a turbojet engine that has a shape of revolution about the longitudinal axis AX.

The turbomachine 1 comprises, in this order on the path of a primary duct 11 of a primary flow, an air inlet duct 2, a fan 3, a low-pressure compressor 4, a high-pressure compressor 6, a combustion chamber 7, a high-pressure turbine 8 and a low-pressure turbine 9.

Generally, the term "air" designates any gas able to serve as an oxidant in the turbomachine 1.

The low-pressure compressor 4, the high-pressure compressor 6, the
high-pressure turbine 8 and the low-pressure turbine 9 delimit a secondary flow duct 13 of a secondary flow that bypasses them.

The high-pressure compressor 6 and the high-pressure turbine 8 are mechanically connected by a drive shaft of the high-pressure compressor 6, so as to form a high-pressure spool of the turbomachine 1. In a similar manner, the low-pressure compressor 4 and the low-pressure turbine 9 are mechanically connected by a turbomachine shaft 1, so as to form a low-pressure spool of the turbomachine 1. The fan 3 is mechanically connected by a reduction gear 152 to the turbomachine low-pressure spool.

the low-pressure compressor 4, the high-pressure compressor 6, the combustion chamber 7, the high-pressure turbine 8 and the low-pressure turbine 9 are surrounded by an internal fairing that extends from the inlet duct 2 as far as the low-pressure turbine 9.

This internal fairing is surrounded by an external casing that delimits the turbomachine radially outwards with respect to the longitudinal axis AX. The external casing delimits radially outwards the secondary duct 13, in particular at the fan 3.

With conjoint reference to FIGS. 2 to 5D, the turbomachine 1 comprises an accessory drive box 170 that includes a fuel pump, a lubricant pump, an electrical generator and a starter for starting the turbomachine 1. The starter comprises a gear train. The accessory drive box 170 is connected by a mechanical power takeoff to the shaft of the high-pressure spool of the turbomachine 1.

Figure 2:
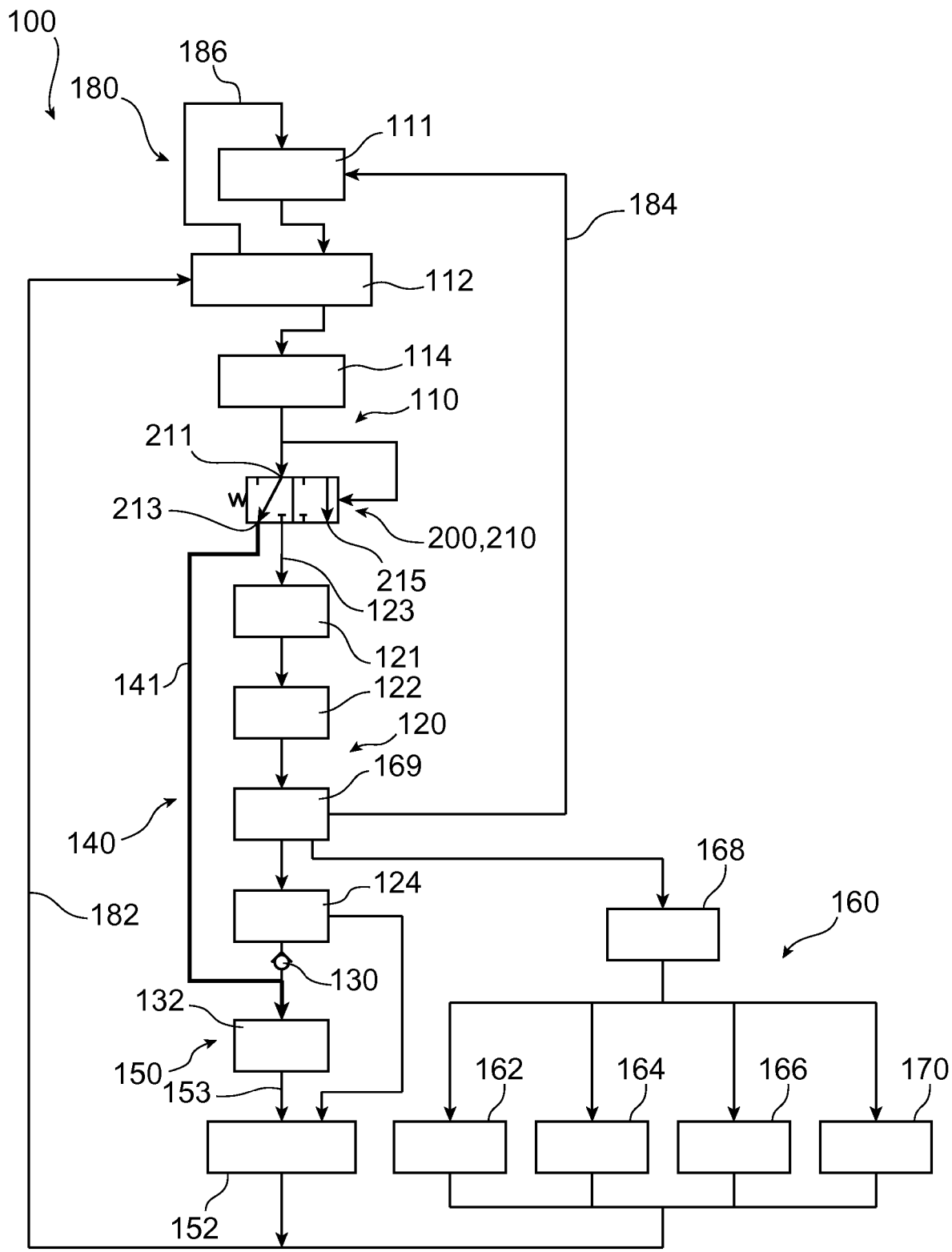
FIG. 2 is a partial schematic representation of a lubrication system according to the first embodiment at low speed.

FIG. 2 shows a lubrication system 100 according to a first embodiment of the invention. The lubricant is typically oil.

The lubrication system 100 comprises an upstream branch 110, a main branch 120 and a bypass branch 140 that are each downstream of the upstream branch 110, a priority branch 150 and a secondary branch 160 that are each located downstream of the main branch 120 and of the bypass branch 140, and a lubricant return circuit 180.

In the present description, the terms upstream and downstream are used with reference to the general direction of flow of the lubricant from upstream to downstream in the lubrication system 100.

The upstream branch 110 comprises a lubricant reservoir 111, a pumping assembly 112, a first hydraulic resistance 114 and a bypass device 200.

The pumping assembly 112 comprises at least one pump for supplying lubricant in the lubrication system 100 and in particular at least one lubricant return pump that is designed to circulate lubricant towards the reservoir 111. Each of these pumps is for example a centrifugal pump that can form part of the accessory drive box 170. The flow rate of lubricant pumped by the pumping assembly 112 depends in particular on the speed of the turbomachine 1, with a maximum flow rate of pumped lubricant that increases as a function of the operating speed of the turbomachine 1.

The lubricant return pump is connected to a third lubricant return branch 186 that brings lubricant from the pumping assembly 112 to the reservoir 111.

In the present description, a hydraulic resistance of a lubrication system element 100 is defined, by analogy with the electricity field, as the size of the ratio between the pressure drop through this element to the flow rate of lubricant passing through this element. By metonymy and still by analogy with the electricity field, a hydraulic resistance corresponds to an element of the lubrication system 100 that is characterised by the value of its hydraulic resistance. The first hydraulic resistance 114 comprises for example an oil filter.

The bypass device 200 comprises at least one first bypass valve 210. The bypass device 200 is mechanically controlled and/or hydraulically controlled by pressure of the lubricant.

Generally, the bypass device 200 is designed to distribute lubricant to the bypass branch 140 when the pressure and the flow rate of lubricant in the lubrication system 100 risks being insufficient to correctly supply the whole of the turbomachine 1. More precisely, the bypass device 200 is configured to supply lubricant to the main branch 120 when a lubricant pressure value is strictly greater than a threshold value. It is configured to supply the bypass branch 140 with lubricant when the lubricant pressure value is below the threshold value.

Figure 6A:
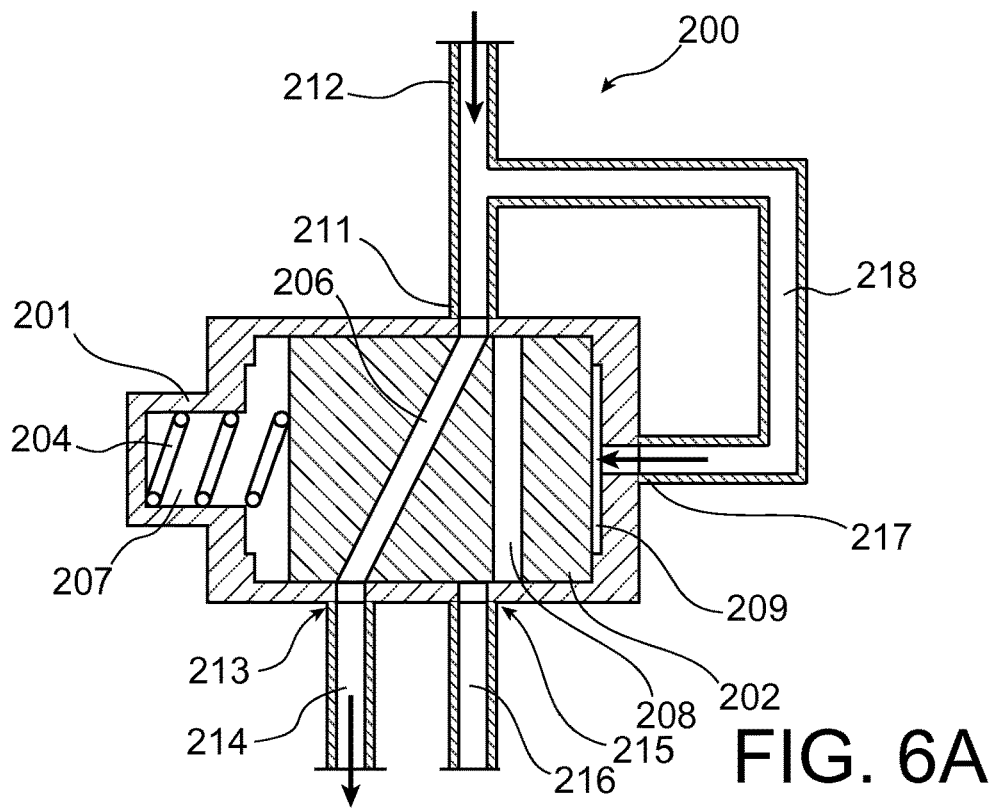
FIG. 6A is a schematic representation of the bypass valve of the lubrication system according to the first embodiment when the bypass valve is in the first open position.
Figure 6B:
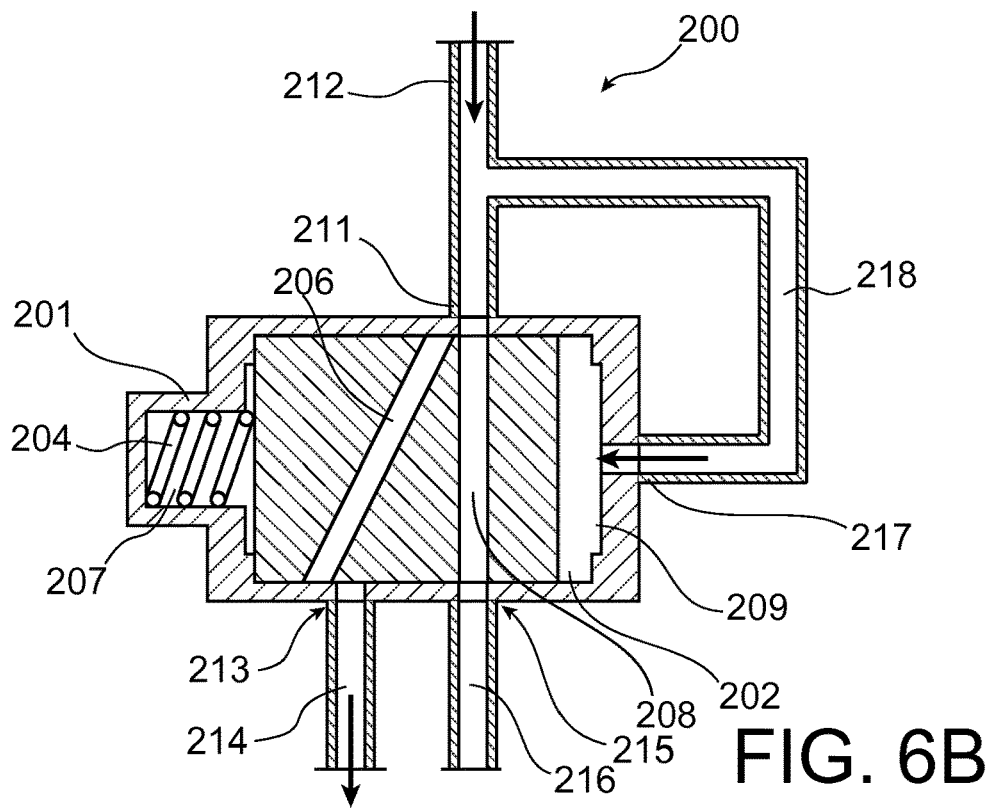
FIG. 6B is a schematic representation of the bypass valve of the lubrication system according to the first embodiment when the bypass valve is in the second open position.

With reference more specifically to the first embodiment and to FIGS. 6A and 6B, the bypass device 200 comprises the first bypass valve 210, a lubricant intake pipe 212, a pressurisation pipe 218, a first lubricant outlet pipe 214 and a second lubricant outlet pipe 216.

The first bypass valve 210 comprises a lubricant inlet 211, a pressurisation inlet 217, a first lubricant outlet 213, a second lubricant outlet 215, an obturator 202 and a spring that forms a means 204 for elastically acting on the obturator. The lubricant intake 211 is fluidically connected to the lubricant intake pipe 212. The pressurisation inlet 217 is fluidically connected to the pressurisation pipe 218. The first lubricant outlet 213 is fluidically connected to the bypass branch 140. The second outlet 215 is fluidically connected to the main branch 120.

The pressurisation pipe 218 is fluidically connected firstly to the inlet pipe and secondly to the pressurisation inlet 217. The pressurisation pipe 218 makes it possible to bring lubricant to the pressurisation inlet 217, which has a pressure substantially identical to that of the fuel at the lubricant intake 211.

The first bypass valve 210 is bistable. It comprises a first stable open position and a second stable open position.

The first bypass valve 210 is in a first stable open position when the pressure of the lubricant at the inlet 211 of the first bypass valve 210 is below the threshold value. In the first stable open position, the first bypass valve 210 supplies lubricant to the bypass branch 140.

The first bypass valve 210 is in the second stable open position when the pressure of the lubricant at the inlet 211 of the first bypass valve 210 is higher than the threshold value. In the second stable open position, it supplies lubricant to the main branch 120.

The obturator 202 comprises a slide that slides in a housing 201 that delimits the exterior of the first bypass valve 210. The slide of the obturator 202 delimits, inside the housing 201, a first chamber 207 and a second chamber 209 that are each located on either side of the obturator 202 and each have a variable volume. The slide of the obturator 202 has passing through it a first channel 206 and a second channel 208 that is distinct and separated fluidically from the first channel 206.

The spring of the elastic means 204 for acting on the obturator is a compression spring that is located in the first chamber 207 in the embodiment shown. It is configured to act on the obturator 202 so that the first bypass valve 210 is in the first open position. In other words, the elastic acting means 204 of the obturator is configured to elastically act on the obturator 202 so that it closes off the second outlet 215 of the first bypass valve 210.

With reference to FIG. 6A, the obturator 202 closes off the second outlet 215 when the lubricant pressure is below the threshold value under the action of the spring of the elastic acting means 204. The second channel 208 is obstructed by the housing 201. The lubricant inlet 211 then emerges in the first channel 206. The outlet of the first channel 206 is aligned with the first outlet pipe 214. The lubricant can flow from the inlet pipe 212 as far as the first outlet pipe 214 through the first bypass valve 210.

With reference to FIG. 6B, the obturator 202 closes off the first outlet 213 when the pressure of lubricant is higher than the threshold value by opposing the action of the spring of the elastic acting means 204. The first channel 206 is obstructed by the housing 201. The lubricant inlet 211 then emerges in the second channel 208. The outlet of the second channel 208 is aligned with the second outlet pipe 216. The lubricant can flow from the inlet pipe 212 as far as the second outlet pipe 216 through the first bypass valve 210.

With reference once again to FIG. 2, the main branch 120 is fluidically connected to a second outlet 215 of the bypass device 200, by a main pipe 123. It includes from upstream to downstream a first heat exchanger 121, a second heat exchanger 122, a lubricant distributor 169, a third heat exchanger 124 and a first non-return device 130.

The main branch 120 supplies lubricant to the priority branch 150 and the secondary branch 160, when the flow rate and the pressure of lubricant in the lubrication system 100 are sufficient to supply lubricant to the whole of the turbomachine 1. The main branch 120 supplies lubricant to the downstream area of the lubrication system 100 when the speed of the turbomachine 1 is sufficiently great, typically in speeds other than takeoff and landing, for example at cruising speed of the turbomachine 1.

Each of the heat exchangers 121, 122, 124 may be an air-oil heat exchanger or an oil-fuel heat exchanger. Each heat exchanger may be an exchanger of the brick type or a surface heat exchanger. The heat exchangers 121, 122, 124 may be arranged in series and/or in parallel with each other.

The lubricant distributor 169 is a lubricant directional control valve that includes a lubricant inlet and a plurality of lubricant outlets. It distributes the lubricant that arrives at its inlet between its various outlets. The distributor 169 includes for example a plurality of positions and as many outlets as there are lubrication chambers in the lubrication system 100.

In the embodiment shown, the distributor 169 comprises a lubricant inlet that is located downstream of the second heat exchanger 122, a first lubricant outlet that is fluidically connected downstream of the main branch 120, a second outlet that is fluidically connected to the secondary branch 160, and a third outlet that is fluidically connected to the reservoir 111. The third outlet of the distributor 169 is connected to a second lubricant return branch 184 that brings the lubricant from the lubricant distributor 169 to the reservoir 111. The lubricant distributor 169 is in particular a hydraulic directional control valve with a plurality of channels and a plurality of positions with a known structure.

The first non-return device 130 comprises a non-return valve. It is configured to prevent lubricant from circulating from downstream of the main branch 120 through the main branch 120. The first non-return device 130 prevents the circulation of lubricant from the priority branch 150 to the main branch 120.

The bypass branch 140 is arranged in parallel to the main branch 120. It is fluidically connected, by a bypass pipe 141, to a first outlet 213 of the bypass device 200 and downstream of the first non-return valve 130 to the main pipe 123. The bypass branch 140 comprises a total hydraulic resistance that is less than the total hydraulic resistance of the main branch 120, to limit the pressure drops in the bypass branch 140 with respect to those in the main branch 120.

The bypass branch 140 is intended to supply the priority branch 150 with lubricant so as to be privileged with respect to the secondary branch 160 when the lubricant flow rate and pressure in the lubrication system 100 risk being insufficient to supply the whole of the turbomachine 1 with lubricant. In each of the embodiments shown, the bypass branch 140 supplies lubricant solely to the priority branch 150.

With reference more specifically to the first embodiment, the priority branch 150 comprises, from upstream to downstream, a cut-off valve 132 and the lubrication chamber of the reduction gear 152. The priority branch 150 is connected by a first priority pipe 153 to the main pipe 123, downstream of the first non-return device 130, and to the bypass pipe 141.

The cut-off valve 132 is configured to stop the supply of lubricant to the lubrication chamber of the reduction gear 152 when the pressure of the lubricant supplying this chamber is too great. It aims to protect the reduction gear 152 when there is a disturbance in the supply of lubricant in this lubrication chamber.

The lubrication chamber of the reduction gear 152 supplies the reduction gear 152 with lubricant both to lubricate it and to cool it. In particular, it lubricates the teeth of the reduction gear 152 to limit wear thereon when the turbomachine 1 is operating.

The secondary branch 160 comprises a fourth heat exchanger 168, a first bearing lubrication chamber 162, a second bearing lubrication chamber 164, a third bearing lubrication chamber 166 and a lubrication chamber of the accessory box 170. It is supplied with lubricant solely by the distributor 169 in the embodiment shown.

The fourth heat exchanger 168 may be an air-oil heat exchanger or an
oil-fuel heat exchanger. It may be an exchanger of the brick type or a surface heat exchanger.

Each of the lubrication chambers 162, 164, 166 is a lubrication chamber of a turbomachine shaft bearing, in particular of a shaft of the high-pressure spool or of the low-pressure spool of the turbomachine 1. Each of the lubrication chambers 162, 164, 166 supplies the corresponding bearing to lubricate it and to cool it. In particular, it lubricates the rolling parts of the bearing while the turbomachine 1 is operating.

The lubrication chamber of the accessory drive box 170 supplies lubricant to the gears of the accessory drive box 170, in particular the gears of the turbomachine starter.

The first lubrication chamber 162, the second lubrication chamber 164, the third lubrication chamber 166 and the accessory drive box 170 are arranged in pairs in parallel. They are each arranged downstream of the fourth heat exchanger 168.

Each of the bearing lubrication chambers 162, 164, 166 and the chamber of the accessory drive box 170 are fluidically connected to a first lubricant return branch 182 that brings lubricant from each of the bearing lubrication chambers 162, 164, 166 and from the chamber of the accessory drive box 170 as far as the reservoir 111.

With reference more specifically to FIG. 2 and to FIG. 6A, the pressure of the lubricant at the inlet 211 of the first bypass valve 210 is below the threshold value. The turbomachine 1 is for example in a starting phase. The pressure supplied by the pumping assembly 112 is insufficient to supply the main branch 120. The first bypass valve 210 is in the first open position and supplies solely the bypass branch 140 with lubricant, through the first lubricant outlet 213. The secondary branch 160 is not supplied with lubricant, because of the absence of circulation of lubricant in the main branch 120. The lubricant at the outlet of the bypass branch 140 supplies the priority branch 150 in the direction of the lubrication chamber of the reduction gear 152. The reduction gear 152 is sufficiently cooled and lubricated despite the low flow rate and the low pressure of lubricant in the lubrication system 100.

Figure 3:
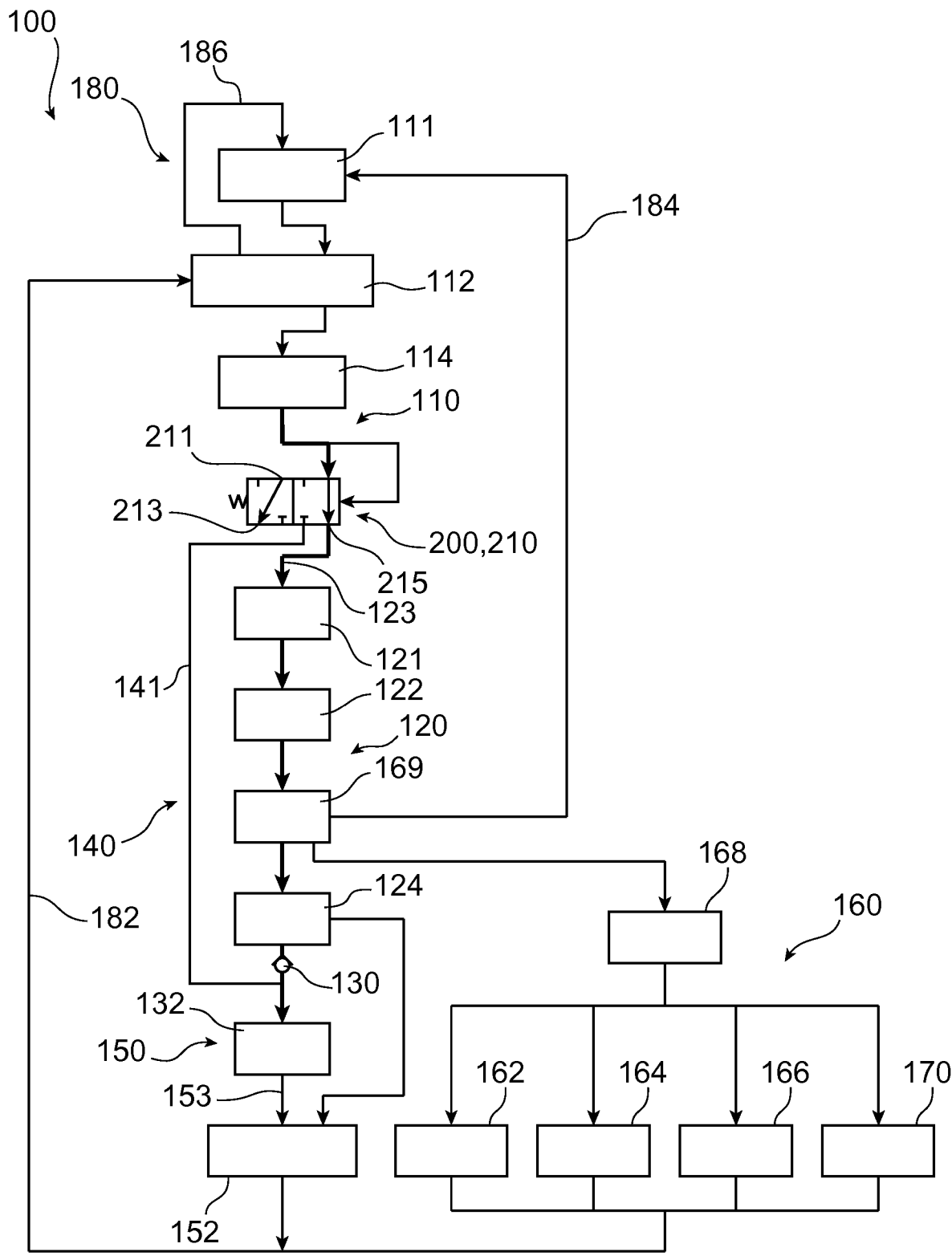
FIG. 3 is a partial schematic representation of a lubrication system according to the first embodiment at high speed.

With reference more specifically to FIG. 3 and to FIG. 6B, the pressure of the lubricant at the inlet 211 of the first bypass valve 210 is above the threshold value. The turbomachine 1 is for example in a cruising speed. The pressure supplied by the pumping assembly 112 is sufficient to supply the main branch 120. The first bypass valve 210 is in the second open position and supplies solely the main branch 120 with lubricant, through the second lubricant outlet 215. The lubricant is cooled in the heat exchangers 121, 122, 124 of the main branch 120. The priority branch 150 and the secondary branch 160 are each supplied with lubricant, by the main branch 120.

The lubricant that circulates in the secondary branch 160 is cooled by the fourth heat exchanger 168. Each of the bearing lubrication chambers 162, 164, 166 and the chamber of the accessory drive box 170 are supplied with lubricant.

The lubricant at the outlet of the main branch 120 supplies the priority branch 150 in the direction of the lubrication chamber of the reduction gear 152. The reduction gear 152 is sufficiently cooled and lubricated despite the pressure drop in the secondary branch 160 and the flow rate of lubricant in the secondary branch 160.

Figure 7:
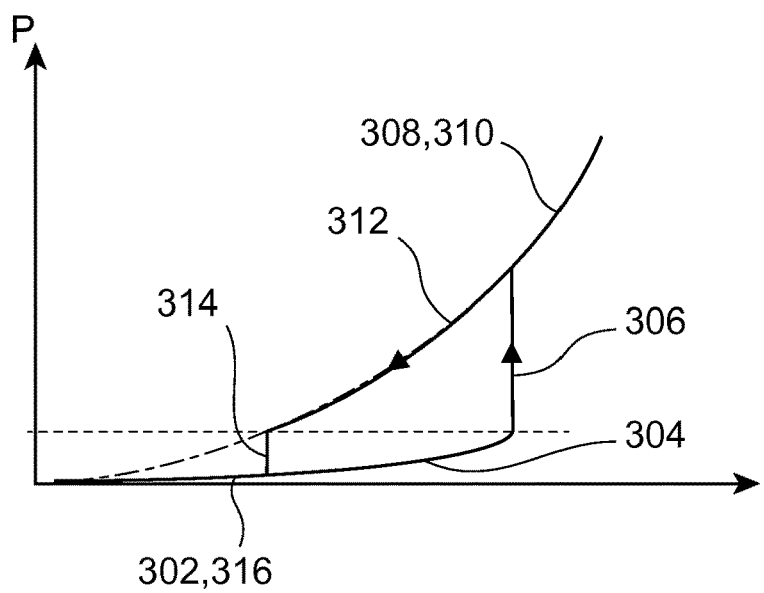
FIG. 7 illustrates the pressure drop of the bypass valve according to the first embodiment with respect to the pressure drop of a valve with a conventional structure.
Figure 8:
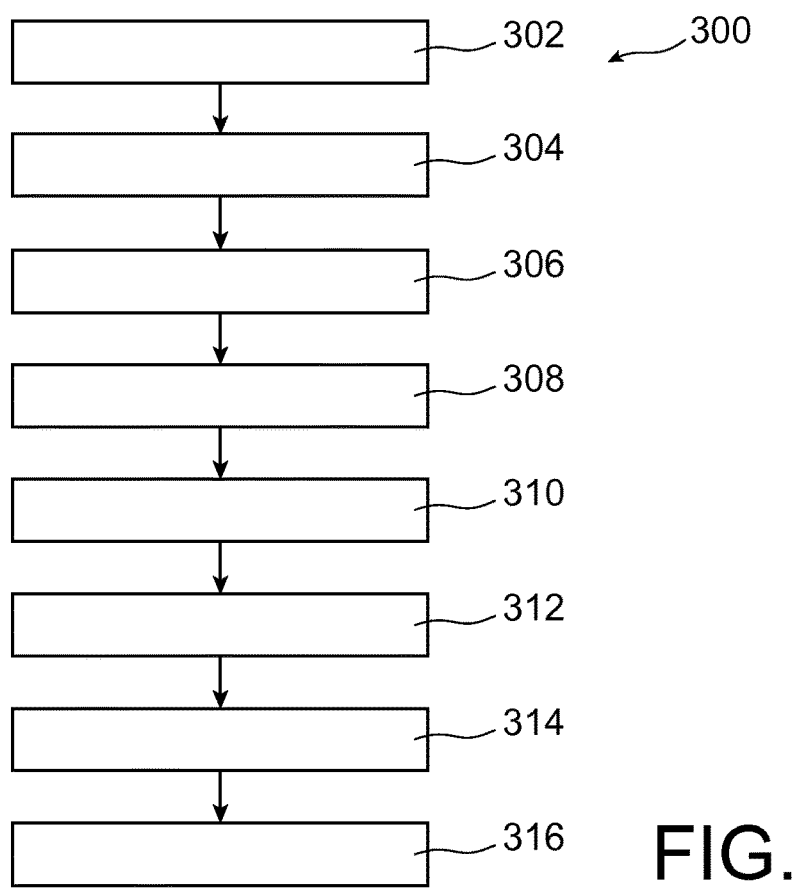
FIG. 8 illustrates a turbomachine lubrication method, by means of a lubrication device according to one of the embodiments of the invention.

The operation of the first bypass valve 210 during a flight of the turbomachine 1 is now described with conjoint reference to FIGS. 7 and 8. FIGS. 7 and 8 each illustrate a method 300 for lubricating the turbomachine 1 during a flight.

The turbomachine 1 is first in a starting phase 302, 304, wherein the speed of the turbomachine is low. The flow rate and the pressure of lubricant in the lubrication system 100 increases but they are insufficient to supply the secondary branch 160. The pressure of the lubricant at the inlet 211 of the first bypass valve 210 is below the threshold value. The first bypass valve 210 is in the first open position. Only the lubrication chamber of the reduction gear 152, which is in the priority branch 150, is supplied with lubricant, by means of the bypass branch 140.

In a first transient operating speed 306 of the turbomachine 1, the flow rate of lubricant increases and the pressure of the lubricant at the inlet 211 of the first bypass valve 210 exceeds the threshold value. The first bypass valve 210 switches into its second stable open position wherein it supplies lubricant to the main branch 120. The main branch 120 having a hydraulic resistance greater than that of the bypass valve 140, the pressure drop in the lubrication system 100 increases abruptly at a substantially constant flow rate of lubricant. The priority branch 150 and the secondary branch 160 are supplied with lubricant. Each of the bearing lubrication chambers 162, 164, 166, the lubrication chamber of the accessory drive box 170 and the lubrication chamber of the reduction gear 152 are supplied with lubricant.

In a first cruising speed 308 of the turbomachine 1, the flow rate of lubricant increases and the pressure of the lubricant in the lubrication system 100 increases. The first bypass valve 210 is in its second stable open position wherein it supplies lubricant to the main branch 120. The priority branch 150 and the secondary branch 160 are supplied with lubricant. Each of the bearing lubrication chambers 162, 164, 166, the lubrication chamber of the accessory drive box 170 and the lubrication chamber of the reduction gear 152 are supplied with lubricant.

In another cruising speed 310, 312 of the turbomachine 1, the flow rate of lubricant increases and the pressure of the lubricant in the lubrication system 100 decreases. The pressure at the inlet 211 of the first bypass valve 210 is above the threshold value. The first bypass valve 210 is in its second stable open position wherein it supplies lubricant to the main branch 120. The priority branch 150 and the secondary branch 160 are supplied with lubricant. Each of the bearing lubrication chambers 162, 164, 166, the lubrication chamber of the accessory drive box 170 and the lubrication chamber of the reduction gear 152 are supplied with lubricant.

In a second transient operating speed 314 of the turbomachine 1, the flow rate of lubricant decreases and the pressure of the lubricant at the inlet 211 of the first bypass valve 210 decreases below the threshold value. The first bypass valve 210 switches into its first stable open position wherein it supplies lubricant to the bypass branch 140. The bypass branch 140 having a hydraulic resistance less than that of the main branch 120, the pressure drop in the lubrication system 100 decreases abruptly at a substantially constant flow rate of lubricant. Only the lubrication chamber of the reduction gear 152, which is in the priority branch 150, is supplied with lubricant, by means of the bypass branch 140.

The flow rate of lubricant circulating in the lubrication system 100 is lower in the second transient speed 314 than in the first transient speed 306 of operation of the turbomachine. The bypass device 200 is of the hysteresis operation type, which is particularly favourable in the present case. It leads to supplying the priority branch 150 with lubricant longer at startup of the turbomachine 1, which guarantees a sure supply of lubricant to the lubrication chamber of the reduction gear 152 despite any fluctuations in the lubrication system. It also leads to supplying lubricant to the secondary branch 160 longer close to the stoppage of the turbomachine 1, which guarantees a longer supply of lubricant to the bearing lubrication chambers 162, 164, 166 of the turbomachine and of the lubrication chamber of the accessory drive box 170, when the reduction gear 152 is rather less stressed.

Finally, the turbomachine 1 is in a landing and stop phase 316, wherein the speed of the turbomachine is low. The flow rate and the pressure of lubricant in the lubrication system 100 decrease further and they are insufficient to supply the secondary branch 160. The first bypass valve 210 is in the first open position. Only the lubrication chamber of the reduction gear 152, which is in the priority branch 150, is supplied with lubricant, by means of the bypass branch 140.

Figure 4:
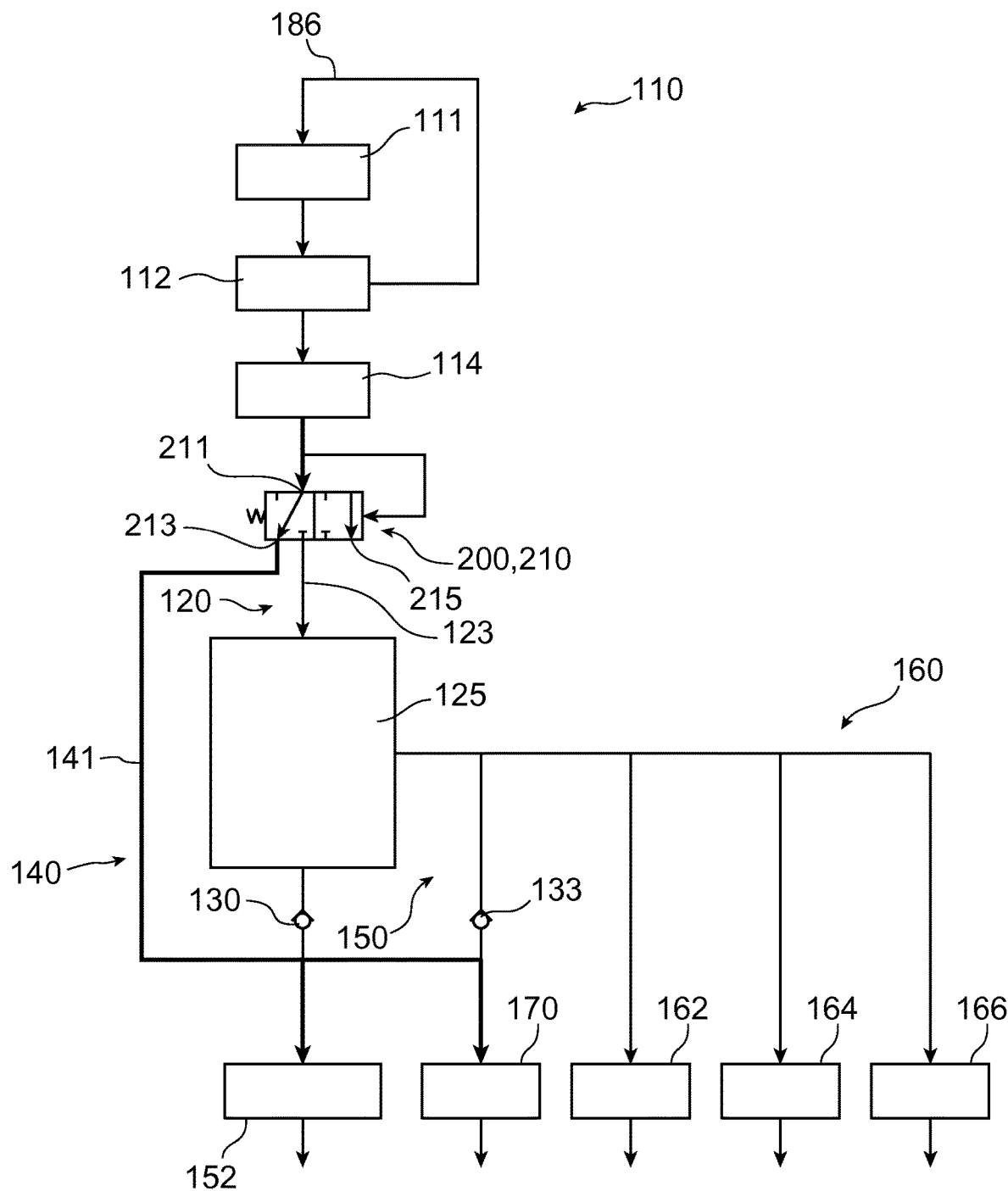
FIG. 4 is a partial schematic representation of a lubrication system according to a second embodiment at low speed.

FIG. 4 shows a lubrication system 100 according to a second embodiment of the invention. The lubrication system 100 according to the second embodiment is distinguished from the one according to the first embodiment mainly by the structure of the priority branch 150 and by the structure of the secondary branch 160. Only the differences between the lubrication system 100 according to the second embodiment with respect to the lubrication system 100 according to the first embodiment will be described below.

The lubrication chamber of the accessory drive box 170 forms part of the priority branch 150 in the second embodiment, instead of being in the secondary branch 160. The lubrication chamber of the accessory drive box 170 is arranged in parallel with the lubrication chamber of the reduction gear 152. The priority branch 150 includes a second non-return device 133 upstream of the lubrication chamber of the accessory drive box 170. This second non-return device 133 comprises a non-return valve. It is configured to prevent the circulation of lubricant from the lubrication chamber of the accessory box 170 to the main branch 120.

The secondary branch 160 comprises the fourth heat exchanger (not shown) and the three bearing lubrication chambers 162, 164, 166 that are each arranged in parallel to each other.

In FIG. 4, the hydraulic resistances of the main branch 120 are shown schematically by a heat-exchanger and lubricant-distribution block 125. The first non-return device 130 of the main branch is nevertheless shown. It prevents the circulation of lubricant from the lubrication chamber of the reduction gear 152 to the main branch 120.

FIGS. 5A, 5B, 5C, 5D show a lubrication system 100 according to a third embodiment of the invention. The lubrication system 100 according to the third embodiment is distinguished from the one according to the first embodiment mainly by the structure of the bypass device 200. Only the differences between the lubrication system 100 according to the third embodiment with respect to the lubrication system 100 according to the first embodiment are described below.

The bypass device 200 of the lubrication system 100 according to the third embodiment comprises the first bypass valve 210 and a second bypass valve 220.

Each of the first bypass valve 210 and second bypass valve 220 has a structure identical to that of the first bypass valve 210 of the lubrication system 100 according to the first embodiment, which was described with reference to FIGS. 6A and 6B. The operation of each of the first bypass valve 210 and second bypass valve 220 during a flight of the turbomachine is similar to what was described with reference to FIG. 7. The lubrication method 300 of the turbomachine 1 during its flight is similar to that which was described with reference to FIG. 8.

Each of the first bypass valve 210 and second bypass valve 220 is bistable with a first stable open position and a second stable open position.

Each of the first bypass valve 210 and second bypass valve 220 is in its first stable open position when the pressure of the lubricant at the inlet 211 of the first bypass valve 210 is below the threshold value, to supply lubricant to the main branch 120.

When the first bypass valve 210 is in its first stable open position, the obturator 202 of the first bypass valve 210 fluidically connects the inlet 211 of the first bypass valve to the first bypass outlet 213 of the first bypass valve. The obturator 202 of the first bypass valve 210 closes off the second lubrication outlet 215 of the first bypass valve 210.

When the second bypass valve 220 is in its first stable open position, the obturator 202 of the second bypass valve 220 fluidically connects the inlet 221 of the second bypass valve 220 to the first bypass outlet 223 of the second bypass valve. The obturator 202 of the second bypass valve 220 closes off the second lubrication outlet 225 of the second bypass valve 220.

Each of the first bypass valve 210 and second bypass valve 220 is in its second stable open position when the pressure of the lubricant at the inlet 211 of the first bypass valve 210 is strictly higher than the threshold value, to supply lubricant to the bypass branch 140.

When the first bypass valve 210 is in its second stable open position, the obturator 202 of the first bypass valve 210 fluidically connects the inlet 211 of the first bypass valve to the second bypass outlet 215 of the first bypass valve. The obturator 202 of the first bypass valve 210 closes off the first lubrication outlet 213 of the first bypass valve 210.

When the second bypass valve 220 is in its second stable open position, the obturator 202 of the second bypass valve 220 fluidically connects the inlet 221 of the second bypass valve 220 to the second bypass outlet 225 of the second bypass valve. The obturator 202 of the second bypass valve 220 closes off the first lubrication outlet 223 of the second bypass valve 220.

The first outlet 213 of the first bypass valve 210 is fluidically connected to the lubricant inlet 221 of the second bypass valve 220, by a first bypass pipe 143.

The second outlet 215 of the first bypass valve 210 is fluidically connected to the main pipe 123, to directly supply lubricant to the main branch 120 when the pressure of the lubricant at the inlet 211 of the first bypass valve 210 is strictly higher than the threshold value.

The first outlet 223 of the second bypass valve 220 is fluidically connected to the bypass pipe 141 to supply solely the priority branch 150, to the detriment of the secondary branch 160, by the bypass branch 140. In other words, the second bypass valve 220 is fluidically connected in series to the first bypass valve 210 to supply the bypass branch 140 with lubricant when the pressure value of the lubricant is below the threshold value.

The second outlet 225 of the second bypass valve 220 is fluidically connected to the main pipe 123 to supply lubricant to the main branch 120 in the event of failure of the first bypass valve 210. The second outlet 225 of the second bypass valve is in particular connected to the main branch 120 upstream of the first heat exchanger 121 of the main branch 120.

Figure 5A:
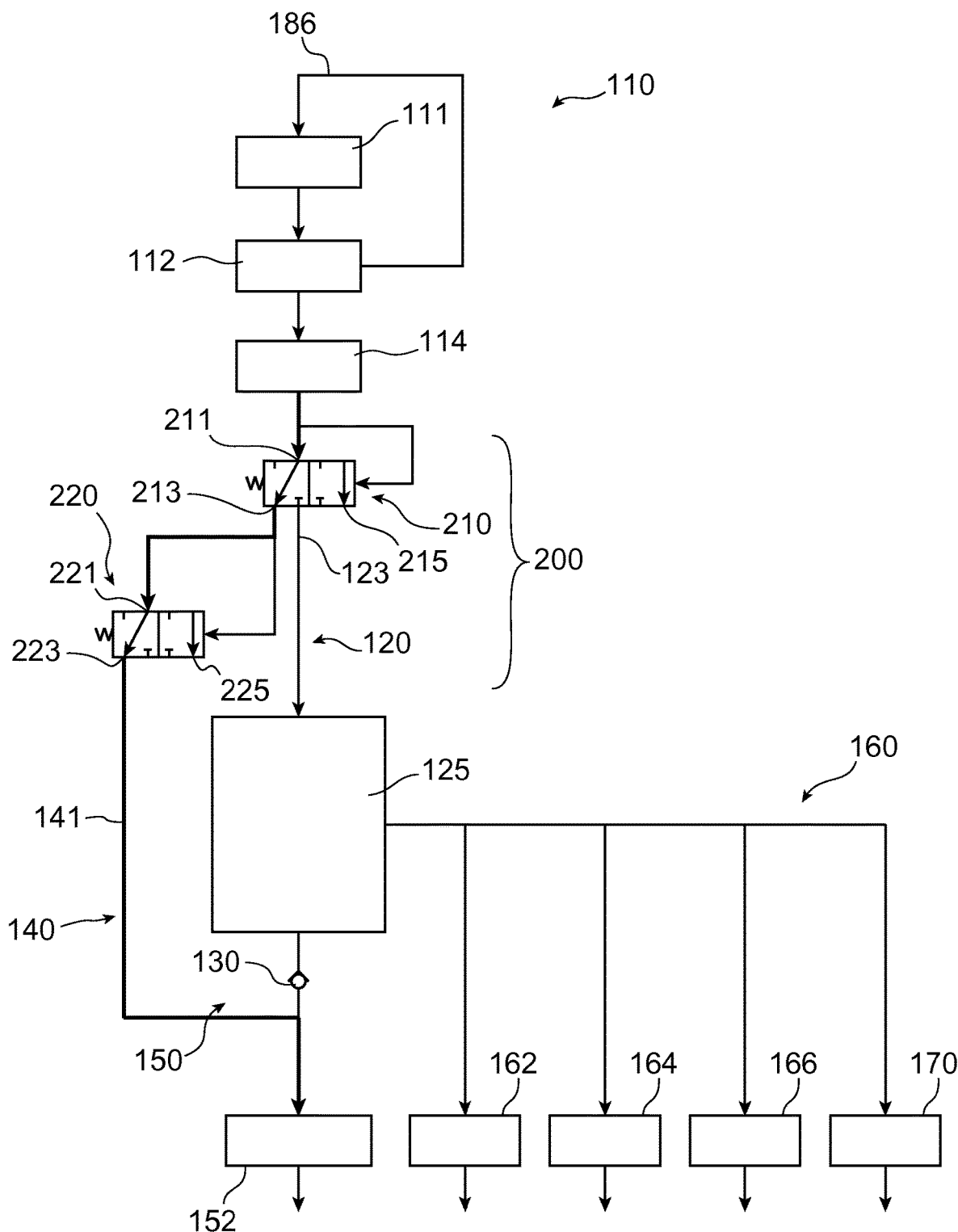
FIG. 5A is a partial schematic representation of a lubrication system according to a third embodiment at low speed.

In FIG. 5A, the hydraulic resistances of the main branch 120 are shown schematically by a heat-exchanger and lubricant-distribution block 125. The first non-return device 130 of the main branch is nevertheless shown. It prevents the circulation of lubricant from the lubrication chamber of the reduction gear 152 to the main branch 120. The fourth heat exchanger 168 is not shown on this figure.

With reference more specifically to FIG. 5A, each of the first bypass valve 210 and second bypass valve 220 is operating normally. The pressure of the lubricant at the inlet 211 of the first bypass valve 210 is below the threshold value. The turbomachine 1 is for example in a startup phase. The pressure supplied by the pumping assembly 112 is insufficient to supply the main branch 120. Each of the first bypass valve 210 and second bypass valve 220 is in the first open position and supplies solely the bypass branch 140 with lubricant, through the first lubricant outlet 213 of the first bypass valve 210 and through the first lubricant outlet 223 of the second bypass valve 220. The secondary branch 160 is not supplied with lubricant, because of the absence of circulation of lubricant in the main branch 120. The lubricant at the outlet of the bypass branch 140 supplies the priority branch 150 in the direction of the lubrication chamber of the reduction gear 152. The reduction gear 152 is sufficiently cooled and lubricated despite the low flow rate and the low pressure of lubricant in the lubrication system 100.

Figure 5B:
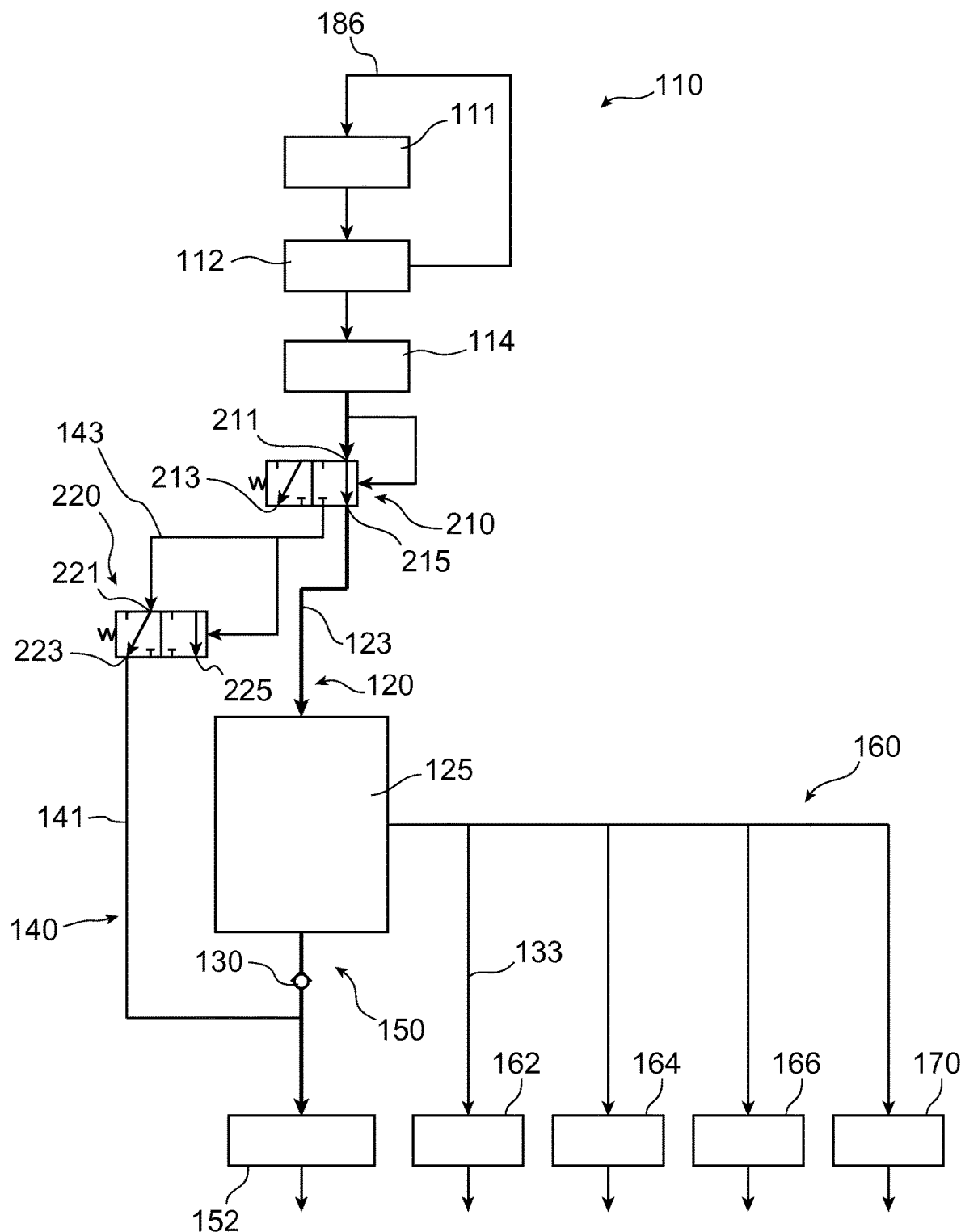
FIG. 5B is a partial schematic representation of the lubrication system according to the third embodiment at high speed.

With reference more specifically to FIG. 5B, each of the first bypass valve 210 and second bypass valve 220 is operating normally. The pressure of the lubricant at the inlet 211 of the first bypass valve 210 is above the threshold value. The turbomachine 1 is for example in a cruising speed. The pressure supplied by the pumping assembly 112 is sufficient to supply the main branch 120. The first bypass valve 210 is in the second open position and supplies solely the main branch 120 with lubricant, through the second lubricant outlet 215. The inlet 221 of the second bypass valve 220 is not supplied with lubricant. The lubricant is cooled in the heat exchangers 121, 122, 124 of the main branch 120. The priority branch 150 and the secondary branch 160 are each supplied with lubricant, by the main branch 120.

The lubricant that circulates in the secondary branch 160 is cooled by the fourth heat exchanger 168. Each of the bearing lubrication chambers 162, 164, 166 and the chamber of the accessory drive box 170 are supplied with lubricant.

The lubricant at the outlet of the main branch 120 supplies the priority branch 150 in the direction of the lubrication chamber of the reduction gear 152. The reduction gear 152 is sufficiently cooled and lubricated despite the pressure drop in the secondary branch 160 and the flow rate of lubricant in the secondary branch 160.

Figure 5C:
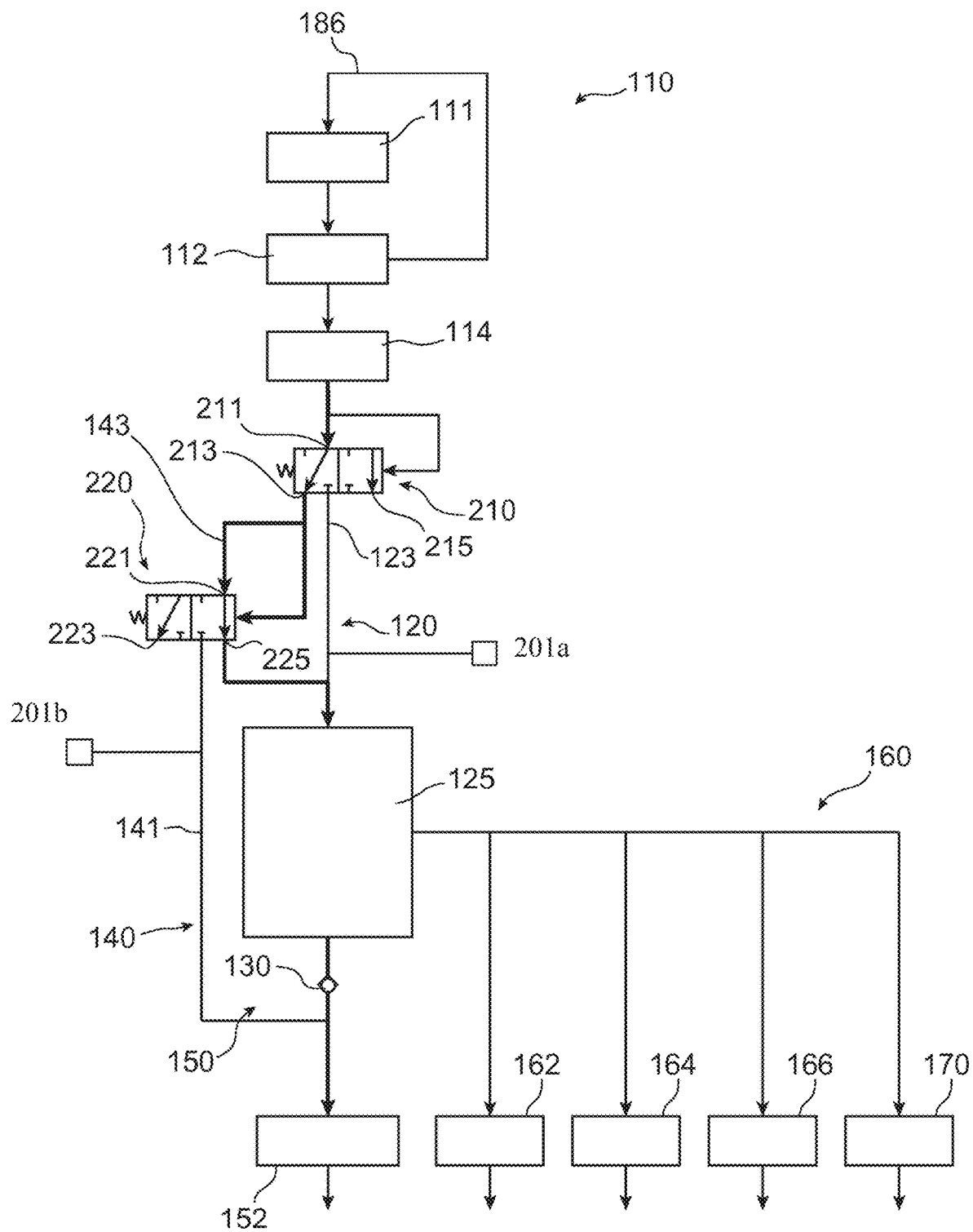
FIG. 5C is a partial schematic representation of the lubrication system according to the third embodiment at high speed and in the case of unwanted locking of the first bypass valve in the first open position thereof.

With reference more specifically to FIG. 5C, the first bypass valve 210 is faulty and is locked in its first stable open position. The pressure of the lubricant at the inlet 211 of the first bypass valve 210 is above the threshold value. The turbomachine 1 is for example in a cruising speed. The pressure supplied by the pumping assembly 112 is sufficient to supply the main branch 120. The failure of the first bypass valve 210 would be liable to lead to the absence of lubrication of the secondary branch 160, in particular of each of the bearing lubrication chambers 162, 164, 166 and of the accessory drive box 170. Damage to the rolling bearings of the turbomachine and/or of the accessory drive box 170 could result therefrom.

The first bypass valve 210 is in the first open position and supplies lubricant to the inlet 221 of the second bypass valve 220. The second bypass valve 220 is operating normally and is in its second stable open position. The inlet 221 of the second bypass valve 220 is fluidically connected to the second outlet 225 of the second bypass valve 220 and to the main branch 120. The priority branch 150 and the secondary branch 160 are each supplied with lubricant, by the main branch 120.

Figure 5D:
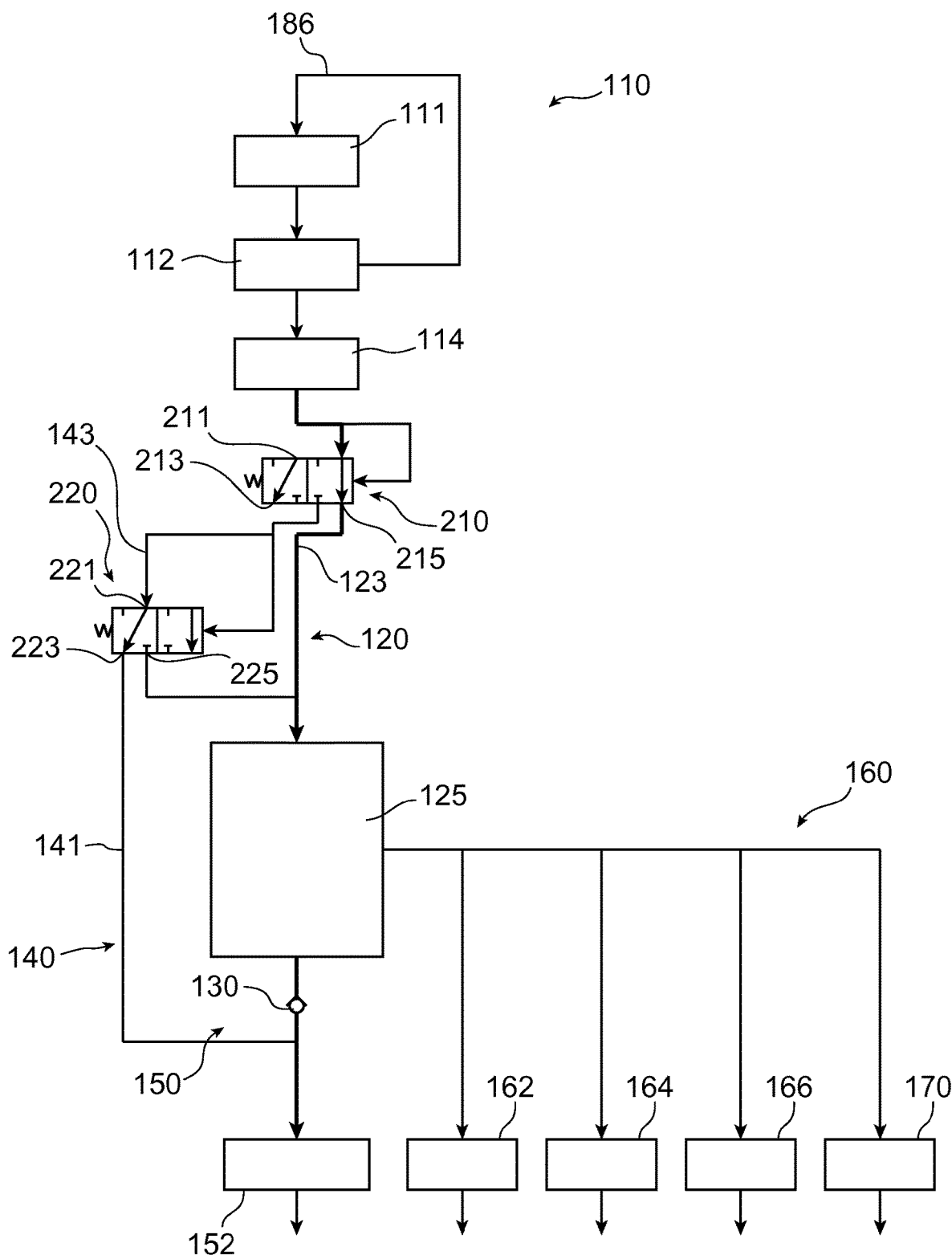
FIG. 5D is a partial schematic representation of the lubrication system according to the third embodiment at high speed and in the case of unwanted locking of the second bypass valve in the first open position thereof.

With reference more specifically to FIG. 5D, the second bypass valve 220 is faulty and is locked in its first stable open position. The pressure of the lubricant at the inlet 211 of the first bypass valve 210 is above the threshold value. The turbomachine 1 is for example in a cruising speed. The pressure supplied by the pumping assembly 112 is sufficient to supply the main branch 120. The failure of the second bypass valve 220 could lead to the absence of lubrication of the secondary branch 160, in particular of each of the bearing lubrication chambers 162, 164, 166 and of the accessory drive box 170. Damage to the rolling bearings of the turbomachine and/or of the accessory drive box 170 could result therefrom.

The first bypass valve 210 is in the second open position and supplies lubricant solely to the main branch 120, through the second lubricant outlet 215. The inlet 221 of the second bypass valve 220 is not supplied with lubricant. The second bypass valve 220 cannot therefore direct the lubricant abnormally through the bypass branch 140. The lubricant is cooled in the heat exchangers 121, 122, 124 of the main branch 120. The priority branch 150 and the secondary branch 160 are each supplied with lubricant, by the main branch 120.

By means of the lubrication system 100 according to the invention, the reduction gear 152 is supplied with lubricant in a privileged manner, by means of the bypass branch 140, with respect to heat exchangers 121, 122, 124 and bearing lubrication chambers 162, 164, 166 when the flow rate of lubricant and the lubricant pressure are too low to supply lubricant to the whole of the lubrication system 100.

The reduction gear 152 is supplied with lubricant by the bypass branch 140 when the turbomachine is operating at low speed. It is in particular supplied with lubricant by the main branch 120 when the flow rate and pressure of the lubricant are sufficient to supply the whole of the lubrication system 100, in particular when the turbomachine 1 is operating at high speed.

Naturally, various modifications can be made by a person skilled in the art to the invention that has just been described without departing from the scope of the description of the invention.

In a variant, the turbomachine 1 is a turbomachine with a pair of non-faired contrarotatory propellers. Such turbomachines 1 are also known in English by the term "open rotor". In this case, the reduction gear 152 is for example configured to rotate the propellers, by connecting them in particular to the
low-pressure spool of the turbomachine.

In a variant again, the turbomachine 1 is a turboprop engine that comprises a propeller at the entrance to the turbomachine.

The structure of each of the hydraulic resistances of the lubrication system may vary. For example, each of these hydraulic resistances may include a heat exchanger, a filter, a cut-off valve and/or a flow meter.

The structure of the bypass device 200 may vary, in particular as long as the bypass device 200 allows lubricant to circulate in the main branch 120 at least for certain operating speeds of the turbomachine 1.

In a variant, the bypass device 200 is mechanically, electrically and/or pneumatically controlled. The bypass device 200 may be electrically controlled, for example by a digital regulation system of the turbomachine. Such a digital regulation system is also known by the term "FADEC".

In a variant of the third embodiment, the bypass device 200 may include a first bypass valve 210 and a second bypass valve 220 that are arranged fluidically in parallel. Nevertheless, the arrangement of the bypass device 200 of the lubrication system 100 according to the third embodiment remains preferred to such a variant embodiment since it favours a better distribution of the lubricant in the event of failure of a valve from the first bypass valve 210 and the second bypass valve 220.

The structure of the first bypass valve 210 and/or the structure of the second bypass valve 220 may vary.

In a variant, the elastic means 204 for acting on at least one bypass valve 210, 220 comprises a draw spring that is located in the second chamber 209 and urges the obturator 202 towards the first open position of this valve.

In a variant, at least the first bypass valve 210 comprises at least one stable open position between the first stable open position and the second stable open position, wherein the obturator 202 of the first bypass valve 210 partially supplies the main branch 120 and partially the bypass branch 140. The first bypass valve 210 may comprise a plurality of stable open positions between the first stable open position and the second stable open position, for example a continuity of stable open positions or a series of discrete stable open positions.

More generally, the first bypass valve 210 and/or the second bypass valve 220 may be a type of directional control valve other than a three-way two-position hydraulic directional control valve.

In yet another variant, the pressurisation inlet 215 of the first bypass valve 210 can emerge in the first chamber 207 of the first bypass valve 210 and/or the pressurisation inlet 215 of the second bypass valve 220 can emerge in the first chamber 207 of the second bypass valve 220.

In a variant, the obturator 202 of the first bypass valve 210 comprises a flap valve and/or the obturator 202 of the second bypass valve 220 comprises a flap valve.

The structure of the second bypass valve 220 is for example different from that of the first bypass valve 210.

In a variant of the second embodiment, the bypass device 200 comprises a second bypass valve 220 in addition to the first bypass valve 210, and the bypass device 200 has a similar, if not identical, structure to that of the bypass device of the lubrication system according to the third embodiment.

The main branch 120 and the bypass branch 140 each have a variable structure. The priority branch 150 and the secondary branch 160 each have a variable structure. In particular, the arrangement, the number and the nature of the hydraulic resistances in the lubrication system 100 may vary.

The number of heat exchangers 121, 122, 124 of the branch may vary. The main branch 120 may include at least one filter.

The bypass branch 140 may comprise at least one heat exchanger.

The priority branch 150 may be devoid of cut-off valve 132 upstream of the reduction gear 152 or be devoid of non-return valve 130, in particular when the cut-off valve 132 also serves as a non-return device.

In a variant of the second embodiment, the lubrication system 100 may include a single non-return valve 130 that is located between the outlet of the main branch 120 and the inlet of the priority branch 150.

In a variant of the second embodiment, the priority branch 150 may include a lubricant distributor, typically a hydraulic directional control valve, for distributing the flow of lubricant between the reduction gear 152 and the accessory drive box 170.

The number of lubrication chambers 162, 164, 166 of the secondary branch 160 may vary.

According to a variant embodiment, the lubrication system 100 comprises a device for monitoring the position of the obturator 202 of each bypass valve, which is configured to monitor the position of the obturator 202.

This monitoring device is for example configured to determine a lubricant pressure in the main branch 120, for example by means of a first pressure sensor 201a (FIG. 5C), and to determine a lubricant pressure in the bypass branch 140, for example by means of a second pressure sensor 201b (FIG. 5C). The monitoring device can monitor the position of the obturator 202 by comparing the lubricant pressure value in the main branch 120 and the lubricant pressure value in the bypass branch 140.

What is claimed is:

1. A lubrication system for a turbomachine including a reduction gear for driving a module of the turbomachine, comprising:
    a main branch comprising at least one heat exchanger;
    a non-return device that is configured to limit/prevent the circulation of lubricant from the reduction gear to the main branch, the non-return device comprising a non-return valve; and a bypass branch that is arranged in parallel to the main branch, the bypass branch comprising a hydraulic resistance that is lower than the hydraulic resistance of the main branch,
    the reduction gear that is located downstream of the main branch and of the bypass branch,
    the lubrication system comprising at least one bypass device that is configured to supply the bypass branch with lubricant when a pressure value of the lubricant is below a threshold value.

2. The lubrication system according to claim 1, wherein the bypass device is configured to supply the main branch with lubricant when the pressure value of the lubricant is strictly greater than the threshold value, the bypass device being mechanically controlled and/or hydraulically controlled by pressure of the lubricant.

3. The lubrication system according to claim 1, wherein the bypass device comprises a lubricant inlet, a first lubricant outlet that is fluidically connected to the bypass branch, a second outlet that is fluidically connected to the main branch, an obturator configured to at least partially close off the first outlet and/or the second outlet, and a means for elastically acting on the obturator that is configured to elastically act on the obturator so that it closes off the second outlet,
    the obturator being configured to allow lubricant to circulate to the first outlet when a lubricant pressure is below the threshold value.

4. The lubrication system according to claim 3, wherein the bypass device comprises a first bypass valve and a second bypass valve that is fluidically connected in series to the first bypass valve so that the first bypass valve and the second bypass valve supply the bypass branch with lubricant when the pressure value of the lubricant is below the threshold value,
    the first bypass valve being configured to fluidically supply the main branch directly when the pressure value of the lubricant is strictly higher than the threshold value,
    the first bypass valve comprises a lubricant inlet, a first lubricant outlet, a second outlet that is fluidically connected to the main branch upstream of the heat exchanger, an obturator configured to close off the first outlet or the second outlet, and a means for elastically acting on the obturator that is configured to elastically act on the obturator so that it closes off the second outlet,
    the obturator of the first bypass valve being configured to allow lubricant to circulate towards the first outlet when a lubricant pressure is below the pressure threshold value,
    the second bypass valve comprises a lubricant inlet, a first lubricant outlet that is fluidically connected to the bypass branch, a second outlet that is fluidically connected to the main branch upstream of the heat exchanger, an obturator configured to close off the first outlet of the second outlet, and a means for elastically acting on the obturator that is configured to elastically act on the obturator so that it closes off the second outlet,
    the obturator of the second bypass valve being configured to allow lubricant to circulate towards the first outlet when a lubricant pressure is below the pressure threshold value,
    the first outlet of the first bypass valve being fluidically connected to the lubricant inlet of the second bypass valve.

5. The lubrication system according to claim 3, comprising an obturator-position monitoring device that is configured to monitor the position of the obturator of the bypass device.

6. The lubrication system according to claim 5, wherein the obturator-position monitoring device includes two pressure sensors.

7. The lubrication system according to claim 1, wherein the bypass device comprises a first bypass valve and/or a second bypass valve,
    the first bypass valve and/or the second bypass valve comprising a slide.

8. The lubrication system according to claim 7, wherein the bypass device comprises a first bypass valve and a second bypass valve that is fluidically connected in series to the first bypass valve so that the first bypass valve and the second bypass valve supply the bypass branch with lubricant when the pressure value of the lubricant is below the threshold value,
    the first bypass valve being configured to fluidically supply the main branch directly when the pressure value of the lubricant is strictly higher than the threshold value.

9. The lubrication system according to claim 7, wherein the first bypass valve is bistable.

10. The lubrication system according to claim 9, wherein the first bypass valve comprises a first stable open position wherein the first bypass valve supplies the bypass branch with lubricant and a second stable open position wherein the first bypass valve supplies the main branch with lubricant.

11. The lubrication system according to claim 7, wherein the second bypass valve is bistable.

12. The lubrication system according to claim 11, comprising the first bypass valve and the second bypass valve, wherein the second bypass valve comprises a first stable open position wherein the second bypass valve supplies the first bypass valve with lubricant and a second stable open position wherein the second bypass valve is configured to supply the main branch with lubricant.

13. The lubrication system according to claim 1, wherein the main branch comprises the heat exchanger, a filter, a reservoir, a pump and/or a valve, the main branch comprising a lubricant distributor.

14. The lubrication system according to claim 1, wherein the main branch and/or the bypass branch are configured to supply lubricant to an accessory drive box for a turbomachine that includes a fuel pump, a lubricant pump, an electrical generator and/or a starter for starting the turbomachine.

15. The lubrication system according to claim 14, wherein the starter comprises a gear train.

16. A turbomachine comprising a lubrication system according to claim 1, wherein the turbomachine module comprises a fan or a propeller, a compressor and a turbine, the reduction gear being configured to be driven by the turbine, the turbine being a low-pressure turbine of a turbomachine.

* * * * *